United States Patent

Schmieder

[15] 3,693,012
[45] Sept. 19, 1972

[54] PASSIVE SOURCE OF SECONDARY RADIATION WITH A SOURCE-SHIELD GRID

[72] Inventor: Robert W. Schmieder, Walnut Creek, Calif.

[73] Assignee: The United States of America as represented by the United States Atomic Energy Commission

[22] Filed: Jan. 22, 1971

[21] Appl. No.: 108,827

[52] U.S. Cl............250/106 S, 250/83.3 D, 250/105
[51] Int. Cl..............................G21h 5/00, G21f 5/02
[58] Field of Search.........250/106 S, 105, 83.3 D, 84

[56] References Cited

UNITED STATES PATENTS

| 3,399,303 | 8/1968 | Berk | 250/106 S X |
| 3,132,248 | 5/1964 | Eggebraaten et al | 250/106 SX |
| 3,210,541 | 10/1965 | Cropper et al | 250/106 S X |
| 3,541,332 | 11/1970 | Brunton | 250/83.3 D |

Primary Examiner—Archie R. Borchelt
Attorney—Roland A. Anderson

[57] ABSTRACT

A secondary radiation source including a source-shield grid comprised of a thin layer of radioactive source material coated on one side of a grid of radioactivity shielding material, and a sample positioned facing the radioactive material. A radiation detector is positioned facing the shielding material. Radiation from the source material is unimpeded in the direction of the sample but is blocked from the detector by the shielding material. Radiation from the source material strikes the sample and excites it to emit secondary radiation characteristic of the sample. Open spaces in the grid provide a relatively unimpeded path from the sample to the detector.

6 Claims, 4 Drawing Figures

PATENTED SEP 19 1972　3,693,012

INVENTOR.
Robert W. Schmieder
BY
ATTORNEY.

PASSIVE SOURCE OF SECONDARY RADIATION WITH A SOURCE-SHIELD GRID

BACKGROUND OF THE INVENTION

The present invention relates to a passive source of secondary radiation, and more particularly it relates to such a source equipped with a source-shield grid.

Secondary radiation sources of the prior art generally have a point-source geometry or a point-sample geometry. In a point-source arrangement, a small volume of radioactive material generally of high activity is located opposite a sample having a large area. A detector is located behind the source but there is a shield to prevent direct radiation from the source to the detector. The high-activity source stimulates the large area of the sample to emit radiation past the small point source and its shield towards the detector. The point-source arrangement requires a very intense radioactive source and therefore also has a relatively short lifetime, is dangerous to construct and requires thick shielding. In a point-sample configuration, the source has a much larger area than the sample and is arranged around the sample. The source is shielded from the detector and radiation is detected through an aperture in the shield opposite the sample. The point-sample arrangement may utilize a source of moderate radioactivity but requires a relatively large amount of source material and produces a low ratio of secondary radiation to source radiation.

SUMMARY OF THE INVENTION

In brief, the present invention pertains to a passive source of secondary radiation comprising: a shield formed of a radioactivity shielding material that is arranged in the form of a grid having a plurality of open spaces; a radioactive source material abutting one side of the shield; a sample spaced from the source material and in the path of radiation from the source material; and a detector adjacent the shield, whereby the shield blocks passage of radiation directly from the source material to the detector, and the open spaces in the shield provide a clear path for radiation from the sample to the detector.

It is an object of the invention to provide an inexpensive, versatile, safe, compact, durable self-contained passive source of secondary radiation.

Another object is to minimize the amount of radioactive material used in a passive secondary source.

Another object is to lower the level of activity that is required for the radioactive source material in a passive secondary source.

Another object is to provide a passive secondary source in which a large area of a sample is irradiated by a primary source at close range.

Another object is to maximize the ratio of secondary radiation to primary radiation in a passive secondary source.

Other objects and advantageous features of the invention will be apparent in a description of a specific embodiment thereof, given by way of example only, to enable one skilled in the art to readily practice the invention, and described hereinafter with reference to the accompanying drawing.

DESCRIPTION OF AN EMBODIMENT

Figure 1:
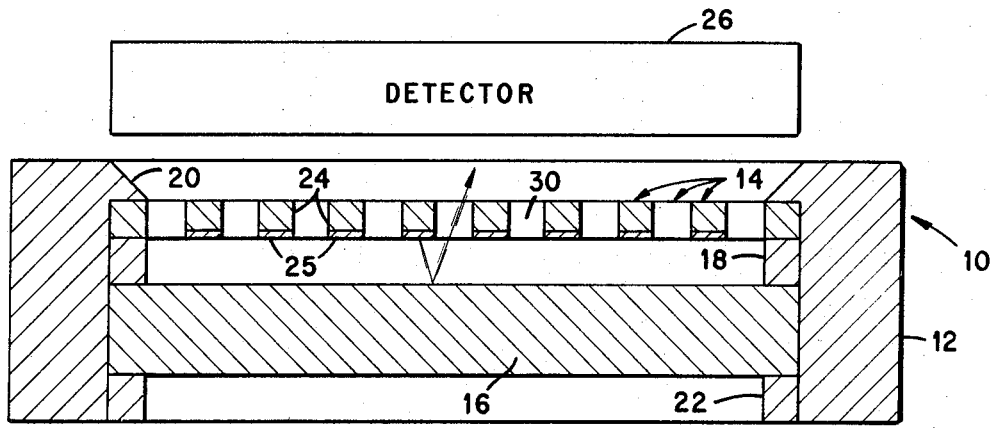
FIG. 1 is a cross-sectional view of a passive secondary source in a configuration that is particularly useful as a calibration or standard source, according to the invention.

Referring to the drawing there is shown in FIG. 1 a passive secondary source 10 which includes a ring-shaped housing 12 within which a source-shield grid 14 and a sample 16 are mounted. The grid and sample are spaced apart by means of a spacer ring 18, and are held in the housing against a shoulder 20 by means of a retaining ring 22. The grid 14 is comprised of a shield of radioactivity shielding material 24 with a primary source of radiation in the form of a thin layer of radioactive source material 25 coated on the side of the grid toward the sample. A detector 26 is located adjacent the opposite side of the grid and is thereby shielded by the material 24 from direct radiation from the source material 25.

In operation, radiation emanates from each point of the radioactive material 25 towards the sample 16. The sample 16 is stimulated thereby to emit radiation towards the detector 26 through openings 30 provided in the grid 14. In practice the grid is made highly transparent, in the range of 90 percent open area, so that a very high percentage of the secondary radiation is unimpeded in the direction of the detector.

The arrangement of the source 10 in FIG. 1 is particularly useful as a standard source such as for calibrating a detector.

Figure 2:
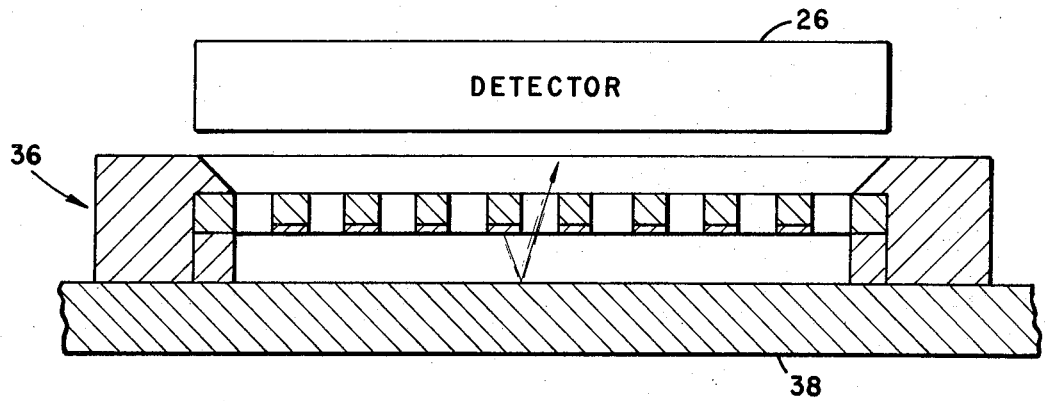
FIG. 2 is a cross-sectional view of a secondary source in a configuration that is particularly useful for sample analysis.

Referring to FIG. 2, a passive source of secondary radiation 36 is shown which is similar to the source 10 but is arranged to be particularly useful for determining the material of successive samples, such as a sample 38.

The thickness shown in FIG. 1 for the source material 25 is for convenience of drawing only. In practice, the coating of source material may be made very thin, of the order of less than 0.0001 inches, and can be centered back from the edges on the shielding material 24 so that there are no straight-line paths from the source material 25 to the detector 26.

Figure 3:
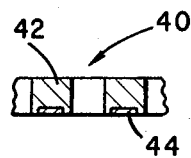
FIGS. 3 and 4 show alternative configuration of a source-shield grid for the passive source of FIGS. 1 and 2.
Figure 4:
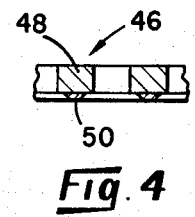

Alternative configurations of the grid 14 are shown in FIGS. 3 and 4. In FIG. 3, a source-shield grid 40 is shown in which a shielding material 42 is provided with recesses that are filled with a radioactive source material 44 to provide additional shielding of the detector 26 from direct radiation from the source material. In FIG. 4, a source-shield grid 46 is shown that includes a grid of shielding material 48 on which a radioactive source material 50 is coated. The edges of the material 50 are tapered and offset from the edges of the shielding material 48 to ensure that there are no straight-line paths from the source material 50 to the detector.

A passive source of secondary radiation exemplifying the invention was constructed in which the shielding material was stainless steel and was 0.020 inches thick.

The stainless steel was formed into a grid by electroforming. The grid had holes that were 0.001 inch square and solid wires that had a width of 0.0,001 inches, thereby providing a grid with more than 90 percent open area. Iron 55 was coated on one side of the grid to a thickness of less than 0.0,001 inch. The detector was a lithium-drifted silicon x-ray detector. The sample was a compound containing calcium, potassium and chlorine. Monochromatic x-rays that are characteristic of these elements were observed.

While an embodiment of the invention has been shown and described, further embodiments or combinations of those described herein will be apparent to those skilled in the art without departing from the spirit of the invention.

What I claim is:

1. A passive source of secondary radiation comprising:
   a. a shield formed of a radioactive shielding material, said shield being arranged in the form of a grid having a multitude of open spaces;
   b. a radioactive source material abutting one side of said shield;
   c. a sample spaced from said source material and in the path of radiation from said source material, said shield being positioned opposite said sample to entirely overlay the area of said sample that is exposed to said radioactive source material, said shield being comprised of lengths of said radioactive shielding material, said lengths being arranged to define said multitude of open spaces, said source material being spread over said lengths of radioactive shielding material; and
   d. a detector adjacent said shield, said shield blocking passage of radiation directly from said source material to said detector, the open spaces of said shield providing a clear path for radiation from said sample to said detector.

2. The secondary source of claim 1, wherein said source material is in the form of a coating on one side of said shield.

3. The secondary source of claim 1, further including recesses in one side of said shield with said source material filling said recesses.

4. The secondary source of claim 1, wherein the side of said shield abutting said source material is flat and the edges of said source material are tapered from the edges of the shield.

5. The secondary source of claim 1, wherein the side of said shield abutting said source material is flat and the edges of said source material are offset from the edges of the shield.

6. The secondary source of claim 1, wherein the area of the open spaces in one side of said shield is greater than 90 percent of the solid area of one side of said shield.

* * * * *